(12) United States Patent
Park

(10) Patent No.: US 7,944,339 B2
(45) Date of Patent: May 17, 2011

(54) METHOD AND SYSTEM FOR RFID COMMUNICATION

(75) Inventor: Eric Park, Mississauga (CA)

(73) Assignee: Psion Teklogix Inc., Mississauga, Ontario (CA)

( * ) Notice: Subject to any disclaimer, the term of this patent is extended or adjusted under 35 U.S.C. 154(b) by 1046 days.

(21) Appl. No.: 11/466,589

(22) Filed: Aug. 23, 2006

(65) Prior Publication Data

US 2008/0061936 A1    Mar. 13, 2008

(51) Int. Cl.
*H04Q 5/22* (2006.01)

(52) U.S. Cl. .................. 340/10.5; 340/572.7; 340/10.41

(58) Field of Classification Search .............. 340/10.1, 340/10.2, 10.3, 10.4, 10.41, 10.42, 825, 3.51, 340/505, 572.1, 10.5, 572.7
See application file for complete search history.

(56) References Cited

U.S. PATENT DOCUMENTS

| | | | |
|---|---|---|---|
| 6,429,776 B1* | 8/2002 | Alicot et al. | 340/572.1 |
| 6,726,099 B2* | 4/2004 | Becker et al. | 235/380 |
| 6,895,221 B2* | 5/2005 | Gunnarsson | 455/41.2 |
| 7,057,512 B2 | 6/2006 | Stilp | |
| 7,124,943 B2* | 10/2006 | Quan et al. | 235/451 |
| 7,155,172 B2* | 12/2006 | Scott | 455/70 |
| 7,156,312 B2* | 1/2007 | Becker et al. | 235/492 |
| 7,180,403 B2* | 2/2007 | Quan | 340/10.3 |
| 7,193,504 B2* | 3/2007 | Carrender et al. | 340/10.4 |
| 7,232,069 B1* | 6/2007 | White | 235/451 |
| 7,401,740 B2* | 7/2008 | Becker et al. | 235/487 |
| 7,413,124 B2* | 8/2008 | Frank et al. | 235/451 |
| 7,755,486 B2* | 7/2010 | Zhu et al. | 340/572.1 |
| 2004/0069852 A1* | 4/2004 | Seppinen et al. | 235/451 |
| 2005/0030160 A1* | 2/2005 | Goren et al. | 340/10.5 |
| 2005/0258940 A1* | 11/2005 | Quan | 340/10.3 |
| 2006/0065730 A1* | 3/2006 | Quan et al. | 235/451 |
| 2006/0238305 A1* | 10/2006 | Loving et al. | 340/10.1 |
| 2006/0280149 A1* | 12/2006 | Kuhl et al. | 370/338 |
| 2010/0079253 A1* | 4/2010 | Phipps et al. | 340/10.1 |
| 2010/0156606 A1* | 6/2010 | Gold | 340/10.4 |
| 2010/0176918 A1* | 7/2010 | Turner et al. | 340/5.61 |

FOREIGN PATENT DOCUMENTS

WO    2005/001744 A2    6/2005

OTHER PUBLICATIONS

Canadian Intellectual Property Office, Office Action, dated Nov. 2, 2010, 3 pages.

* cited by examiner

*Primary Examiner* — Daniel Wu
*Assistant Examiner* — Rufus Point
(74) *Attorney, Agent, or Firm* — Stephen B. Salai, Esq.; Brian B. Shaw, Esq.; Harter Secrest & Emery LLP

(57) ABSTRACT

A method and system for RFID communication is provided. The system includes a first RFID reader and an RFID read-write tag uniquely assigned to the first RFID reader. The RFID read-write tag receives information from RFID readers other than the first RFID reader and provides the information to the first RFID reader.

11 Claims, 7 Drawing Sheets

METHOD AND SYSTEM FOR RFID COMMUNICATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING

Not Applicable

FIELD OF INVENTION

The present invention relates to Radio Frequency Identification (RFID), and more specifically to a method and system for RFID communication.

BACKGROUND OF THE INVENTION

As is inherent in the name an RFID reader incorporates an RF radio for communication with tags. RFID readers will also generally incorporate a means for communication to and from the reader. In the case of wired readers this means may be an Ethernet link or other any other appropriate system and protocol. If the reader is a wireless system the reader may incorporate a second radio as is appropriate for wireless communications. Common radios include RF, 802.11 or Bluetooth radios depending on the nature of the reader and the system with which it is communicating. Additional radios may increase possible applications for an RFID reader system. However, the incorporation of the additional radios in a wireless device adds additional expense to the device. Further a user may incur costs associated with use of a wireless network for communications. Therefore, it is desirable to provide a method and system that has additional utilization of the RFID radio.

BRIEF SUMMARY OF THE INVENTION

It is an object of the invention to provide a method and system that obviates or mitigates at least one of the disadvantages/limitations of existing systems.

In accordance with an aspect of the present invention, there is provided a system for RFID communication. The system includes a first RFID reader, and an RFID read-write tag uniquely assigned to the first RFID reader. The RFID read-write tag includes an RF communication module for communicating with one or more than one second RFID reader using RF signals, and tag circuitry for providing information received through the RF communication module to the first RFID reader through a circuit link.

In accordance with a further aspect of the present invention, there is provided a system for RFID communication. The system includes a first RFID reader, and an RFID read-write tag uniquely assigned to the first RFID reader. The RFID read-write tag includes an RF communication module for communicating with one or more than one second RFID reader and the first RFID reader using RF signals, and tag circuitry for providing information received from the second RFID reader through the RF communication module to the first RFID reader through the RF communication module.

In accordance with a further aspect of the present invention, there is provided a method for RFID communication with a first RFID reader having an RFID read-write tag uniquely assigned to the first RFID reader. At the RFID read-write tag, the method includes the steps of providing an identification of the RFID read-write tag to a second RFID reader, receiving information from the second RFID reader, indicating to the first RFID reader that the RFID read-write tag has received the information, and providing the information from the second RFID reader to the first RFID reader.

This summary of the invention does not necessarily describe all features of the invention.

BRIEF DESCRIPTION OF THE SEVERAL VIEWS OF THE DRAWINGS

These and other features of the invention will become more apparent from the following description in which reference is made to the appended drawings wherein.

DETAILED DESCRIPTION OF THE INVENTION

Figure 1:
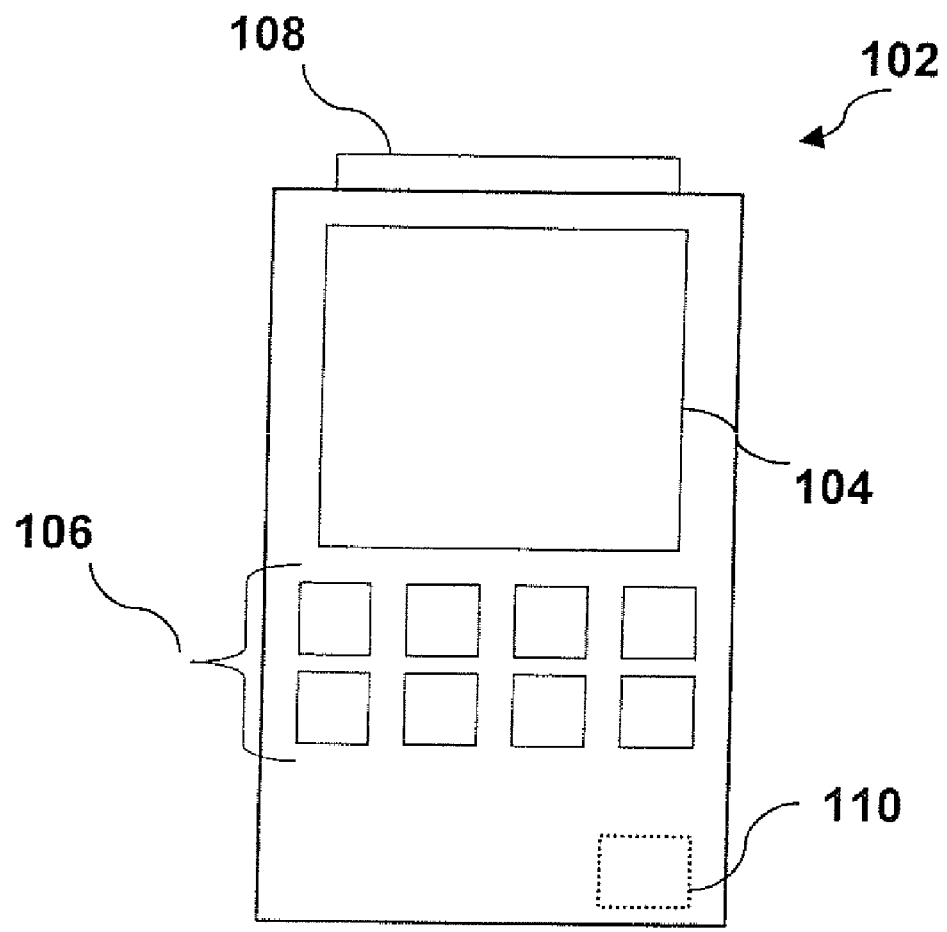
FIG. 1 is a schematic diagram illustrating an RFID reader in accordance with an embodiment of the present invention.

FIG. 1 illustrates an RFID reader in accordance with an embodiment of the present invention. The RFID reader 102 of FIG. 1 includes a display 104 and input keys 106. It is apparent that only a few representational keys 106 are presented in FIG. 1 and the embodiment of the present invention is by no means to be limited to the number of keys 106.

The RFID reader 102 includes an RFID tag 110, which is shown in a dashed line and is integrated within the RFID reader 102. The RFID tag 110 is uniquely assigned to the RFID reader 102, and has a fixed unique identification ID.

The RFID reader 102 communicates with the RFID tag 110 via a circuit link as described below. The RFID reader 102 communicates with tags other than the RFID tag 110 through an RFID antenna 108. The RFID reader 102 may use a wired or some other wireless radio protocol to communicate with other devices/computers.

The RFID tag 110 is a read-write RFID tag and has functionality of communicating with RFID readers, which may include RFID reader-writers. The RFID tag 110 also has functionality of communicating with circuitry for operating the RFID reader 102. Thus, the RFID reader 102 can communicate with any other RFID readers through its RFID tag 110.

The RFID tag 110 receives and stores information provided from an RFID reader other than the RFID reader 102 (e.g., 1a of FIG. 4-5, 1b of FIG. 6) using RF signals (108). The RFID reader 102 reads the information provided from the other RFID reader(s) to its own RFID tag 110 through RFID read operation(s). The information read by the RFID reader 102 from the RFID tag 110 may be provided to a device communicating with the RFID reader 102 (e.g., 256 of FIGS. 5-6). The information read from the RFID tag 110 may be used for applications in the RFID reader 102 or the device communicating with the RFID reader 102, which may include time dependent applications, applications for control decisions, or custom communications. The information read from the RFID tag 110 may include information configuration of the RFID reader 102 or the device communicating with the RFID reader 102. The RFID reader 102 or the device communicating with the RFID reader 102 may be customized using the information read from the RFID tag 110.

The RFID tag 110 may be an active tag that is self-powered, or a passive tag that derives its energy from an RF signal. In the description, "RF signal" and "RFID signal" may be used interchangeably. Communications with the RFID tag 110 may use "Tag-Talks-First (TTF)" protocol or "Reader-Talks-First (RTF)" protocol.

In FIG. 1, the RFID reader 102 is shown as a wireless hand-held device. However, the RFID reader 102 may be a portal reader. The RFID reader 102 may be an RFID reader-writer.

Figure 2:
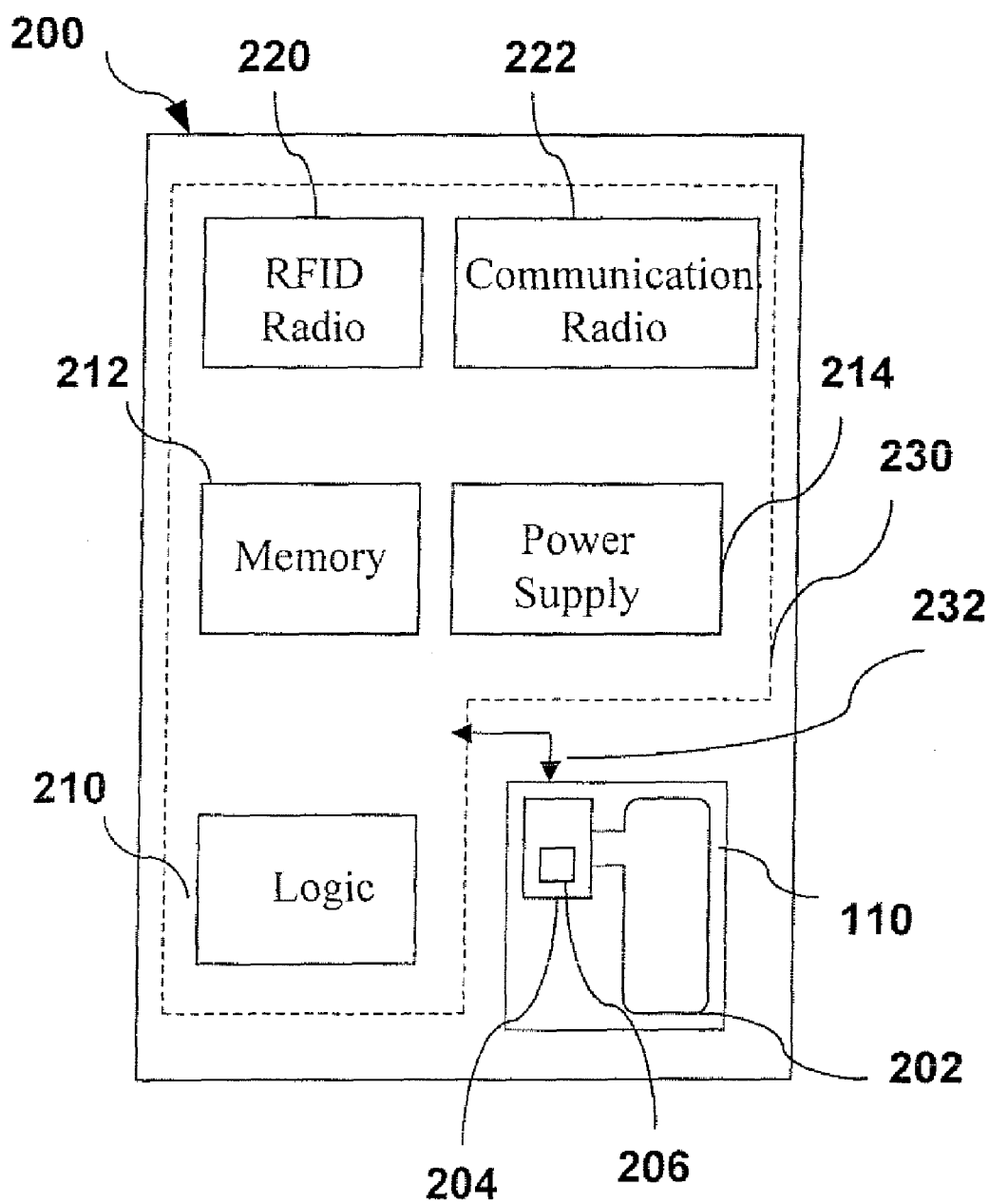
FIG. 2 is a schematic diagram illustrating an example of circuitry components within the RFID reader of FIG. 1.

FIG. 2 illustrates an example of a printed circuit board (PCB) 200 that is located within the RFID reader 102. In FIG. 2, the RFID tag 110 is incorporated as a circuit on the PCB 200 within the RFID reader 102. As such the circuitry of the RFID tag 110 is wired to the circuitry 230 of the RFID reader 102, and is coupled to the reader circuitry 230 via a circuit link 232.

The RFID tag 110 includes an antenna section 202. The antenna section 202 includes an antenna and a circuit for receiving and transmitting data through the antenna using RF signals. Using the RF antenna section 202, the RFID tag 110 communicates with readers other than the RFID reader 102 to which the RFID tag 110 is attached. Those of skill in the art will understand that the representation of the antenna section 202 is schematic only, and the actual configuration of the antenna section 202 may take on a variety of configurations.

The RFID tag 110 includes circuitry 204 and a memory 206. The circuitry 204 includes a circuit for communicating with RFID readers and for interfacing the antenna section 202 and the memory 206. The circuitry 204 has functionality of retrieving data from the memory 206, transmitting the data in the memory 206 via the antenna section 202, and receiving data from the antenna section 202 and writing it into the memory 206. The circuitry 204 also has functionality of communicating with the reader circuitry 230 over the circuit link 232.

The memory 206 has instructions and data for the operation of the circuitry 204. The memory 206 includes an identification circuit for storing the identification ID of the RFID tag 110. The memory 206 is also used to store information specific to the RFID reader 102 to which it is attached, information specific to a device communicating with the RFID reader 102 (e.g., 256 of FIGS. 5-6), or a combination thereof.

The memory 206 includes a read-write non-volatile memory. As would be apparent to one skilled in the art the memory 206 may be EEPROM, Flash, FRAM or any other non-volatile memory that may provide for the operational requirements of the RFID tag 110.

The reader circuitry 230 is provided for the operation of the RFID reader 102. The reader circuitry 230 includes a logic integrated circuit 210, which may be a microcontroller or microprocessor as will be apparent to one skilled in the art. The reader circuitry 230 also includes a memory 212. The memory 212 includes, for example, a Random Access Memory (RAM) and a Read-Only Memory (ROM). The element(s) of the reader circuitry 230 communicates with the circuitry 204 of the RFID tag 110 via the circuit link 232 without using RFID signals.

The memory 212 has instructions and data for initializing and operating the RFID reader 102. The memory 212 has instructions and data for communicating (e.g., interrogation, read, write) with tags including the RFID tag 110, and for communication with a device, such as a computer-based system.

The reader circuitry 230 further includes power supply 214. The power supply 214 may be shared with the RFID tag 110 in the RFID reader 102.

Radio communications are provided by RFID radio 220. The RFID radio 220 communicates with RFID tags other than the RFID tag 110 at a frequency appropriate for the tags and which has been selected with consideration to the application for which the tags are being used.

The RFID reader 102 includes communications radio 222. The communications radio 222 is a non-RFID radio for communications to and from the RFID reader 102. The communications radio 222 may include, but not limited to, an interface for wireless network communications by IEEE 802.11, Bluetooth, etc. The communications radio 222 may be appropriate for cellular communications or may be appropriate for other radio communications. However, the RFID reader 102 may not include the communications radio 222. For example, the RFID reader 102 may be attached to a hand held terminal, which performs radio communications. In this case, the RFID reader 102 is not required to have the communications radio 222.

In FIG. 2, all elements are illustrated separately. However, some or all of these blocks can be monolithically integrated onto a single chip. It will be apparent to one skilled in the art that an RFID reader may contain blocks and/or circuitry that is not shown in FIG. 2.

In FIGS. 1-2, the RFID tag 110 attached to the RFID reader 102 is a built-in tag and is integrated into the circuitry of the RFID reader 102 on the PCB 200. However, in an alternative embodiment, an RFID tag uniquely assigned to an RFID reader is not integrated into the RFID reader, and communicates with the RFID reader over an RF antenna as shown in FIG. 3.

Figure 3:
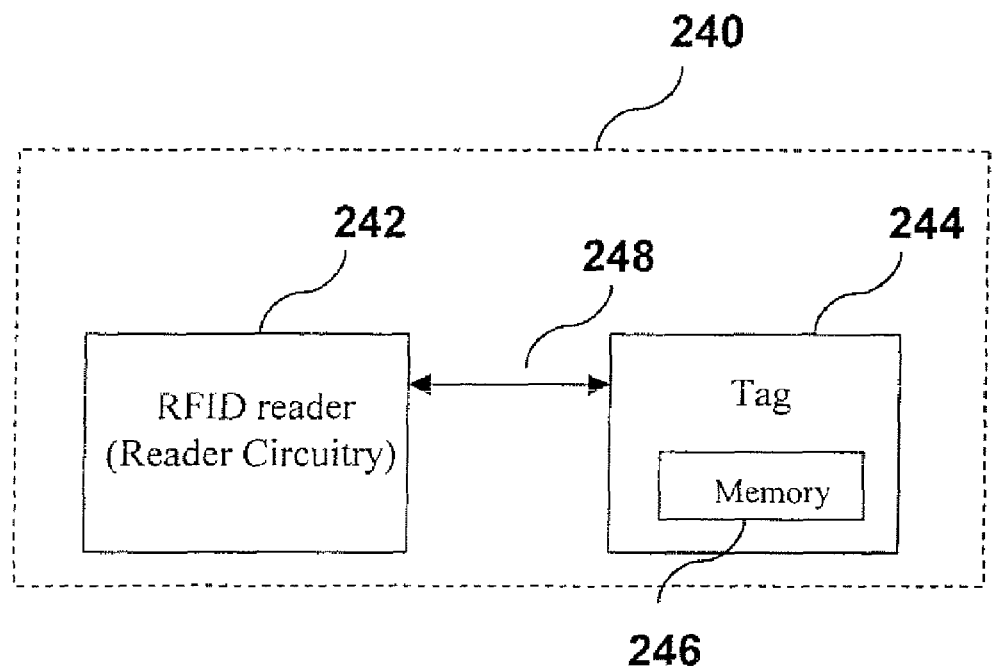
FIG. 3 is a schematic diagram illustrating an RFID reader system in accordance with an embodiment of the present invention.

FIG. 3 illustrates an RFID reader system in accordance with an embodiment of the present invention. The RFID reader system 240 of FIG. 3 includes an RFID reader (reader circuitry) 242 and an RFID tag 244. The reader circuitry of the RFID reader 242 may be same or similar to the reader circuitry 230 of FIG. 2, and is provided for RFID operations (e.g., integration, read, write) on tags including the RFID tag 244.

The RFID tag 244 is provided within the vicinity of the RFID reader 242. The RFID tag 244 is uniquely assigned to the RFID reader 242, and has a uniquely assigned identification ID.

The RFID tag 244 is a read-write tag and has functionality of communicating with RFID readers, including the RFID reader 242. The RFID tag 244 communicates with circuitry for operating the RFID reader 242 using RFID signals 248. The RFID tag 244 includes a memory 246. The memory 246 has instructions and data for the operation of the RFID tag 244. The memory 246 includes an identification circuit for storing the identification ID of the RFID tag 244. The memory 246 is also used to store information specific to the RFID reader 242 to which it is assigned, information specific to a device communicating with the RFID reader 242 (e.g., 256 of FIGS. 5-6), or a combination thereof. The RFID tag 244 may be similar to the RFID tag 110 of FIG. 2. However, in this example, the RFID tag 244 is a stand-alone tag.

Figure 4:
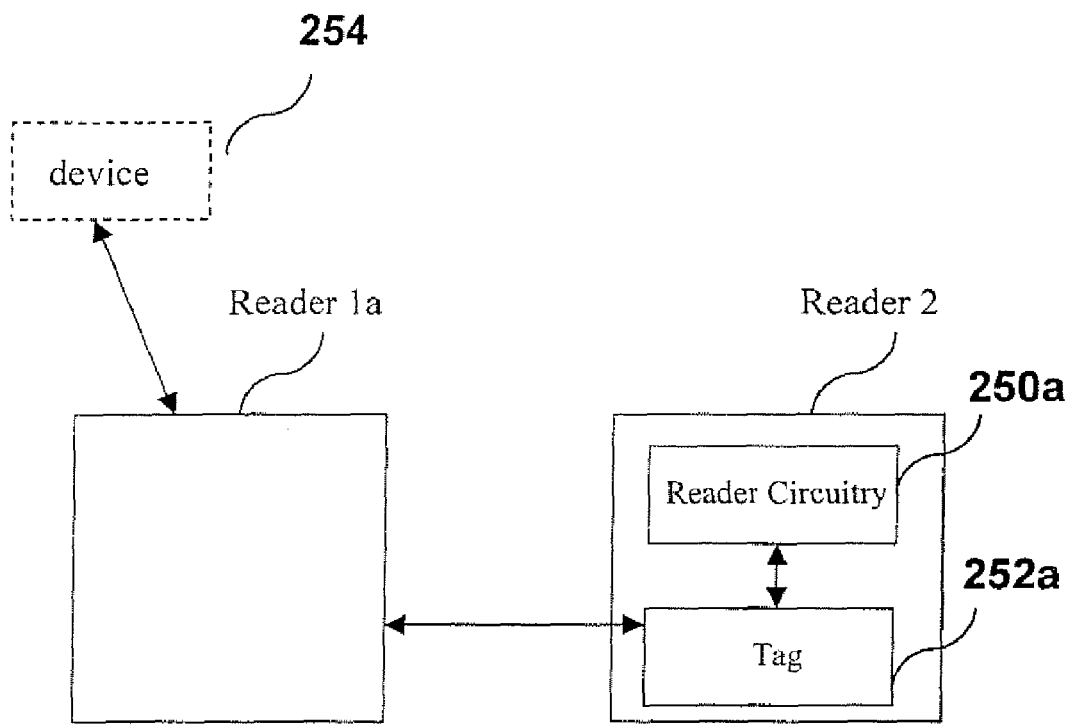
FIG. 4 is a schematic diagram illustrating an example of a network including an RFID tag assigned to the RFID reader.
Figure 5:
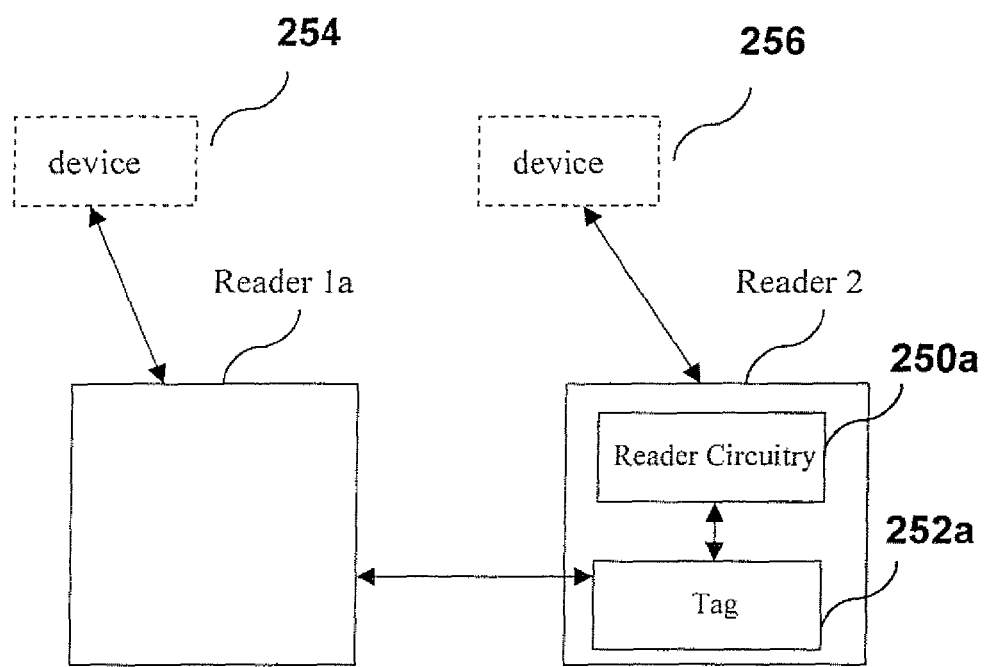
FIG. 5 is a schematic diagram illustrating another example of a network including the RFID tag assigned to the RFID reader.
Figure 6:
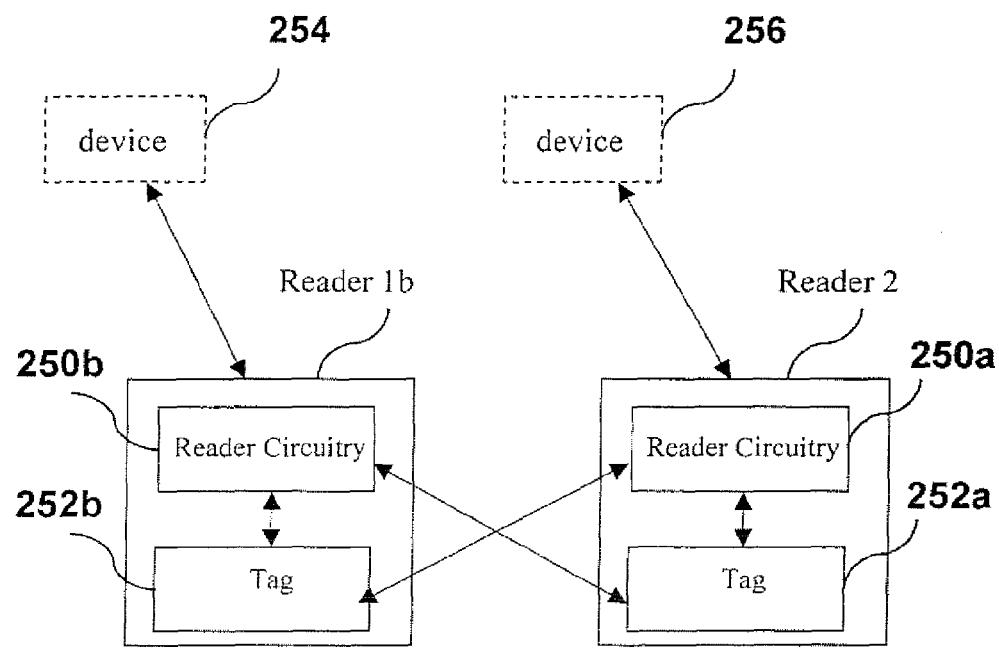
FIG. 6 is a schematic diagram illustrating a further example of a network including the RFID tag assigned to the RFID reader.

The RFID tag 244 is capable of receiving and storing information provided from an RFID reader(s) other than the RFID reader 242 (e.g., 1a of FIG. 4-5, 1b of FIG. 6). The RFID reader 242 reads the information provided to the RFID tag 244 from the other RFID reader(s) through RFID read operation(s). For example, the RFID reader 242 or a device communicating with the RFID reader 242 polls by RFID read operation(s) on its own tag 244 and reads the specific information provided from the other RFID reader(s) to the RFID tag 244. The RFID reader 242 or the device communicating with the RFID reader 242 may use information read from its RFID tag 244 for a time dependent application or a control decision. The RFID reader 242 or the device communicating with the RFID reader 242 may be configured based on the information read from the RFID tag 244. The RFID reader 242 or the device communicating with the RFID reader 242 may be customized using the information read from the RFID tag 244.

The RFID reader 242 may be a portal reader. However, the RFID reader 242 may be a wireless hand-held device. The RFID reader 242 may be an RFID reader/writer. The RFID tag 244 may be an active tag, or a passive tag. Communications with the RFID tag 244 may employ "Tag-Talks-First (TTF)" protocol or "Reader-Talks-First (RTF)" protocol.

FIG. 4 illustrates an example of a network having an RFID tag assigned to the RFID reader. In FIG. 4, an RFID reader 1a and an RFID reader 2 are shown as examples of RFID readers in the network. The RFID reader 2 includes reader circuitry 250a and an RFID tag 252a. The RFID reader 2 may be same or similar to the RFID reader 102 of FIG. 1 or the RFID reader system 240 of FIG. 3.

The RFID tag 252a is uniquely assigned to the RFID reader 2, and has a unique identification ID. The RFID tag 252a may be same or similar to the RFID tag 110 of FIGS. 1-2 or the RFID tag 244 of FIG. 3. The RFID tag 252a may be a built-in tag integrated with the reader circuitry 250a or a stand-alone tag communicating with the reader circuitry 250a using RF signals.

The RFID reader 1a may or may not have a tag. The RFID reader 1a has functionality of communicating with tags including the RFID tag 252a, which includes write operation on the tags. The RFID tag 252a receives information from the RFID reader 1a and transmits it to the reader circuitry 250a.

The RFID reader 1a communicates with a device 254 (e.g., computer system) in a wired or wireless network. The device 254 may include an application and a database. The application may be located in the RFID reader 1a. The device 254 uses the RFID reader 1a to write information into the RFID tag 252a. The RFID tag 252a receives the information from the RFID reader 1a, and stores the information into its memory. The RFID reader 2 polls by performing RFID read operations on its RFID tag 252a to read the information from the RFID reader 1a to the RFID tag 252a.

The RFID reader 2 may use information read from its RFID tag 252a for a time dependent application or a control decision. The device 254 may provide to the RFID tag 252a information associated with configuration of the RFID reader 2, resulting in remote configuration of the RFID reader 2.

The information provide from the RFID reader 1a to the RFID tag 252a may further include, but not limited to, a source identification for identifying a source of the information, a target identification for identifying a target to which the information is provided, and/or any other information.

FIG. 5 illustrates another example of a network having the RFID tag assigned to the RFID reader. In FIG. 5, the RFID reader 2 communicates with a device 256 (e.g., computer system) in a wired or wireless network. The device 256 may include an application and a database. The application may be located in the RFID reader 2. The device 254 uses the RFID reader 1a to write information into the RFID tag 252a. The RFID reader 2 or the device 256 polls by performing RFID read operations on the RFID tag 262a to read the information from the device 254.

The RFID reader 2 or the device 256 may use information read from the RFID tag 252a for a time dependent application or a control decision. The device 254 may provide to the RFID tag 252a information associated with configuration of the device 256, resulting in remote configuration of the device 256.

FIG. 6 illustrates a further example of a network having the RFID tag assigned to the RFID reader. In FIG. 6, an RFID reader 1b communicates with the RFID reader 2 and the device 254. The RFID reader 1b includes reader circuitry 250b and an RFID tag 252b. The reader circuitry 250b and the RFID tag 252b are same or similar to the reader circuitry 250a and the RFID tag 252a of the RFID reader 2, respectively. Each reader circuitry 250a, 250b includes functionality of writing data into tags. The RFID tag 252b is uniquely assigned to the RFID reader 1b. The RFID tag 252b has a fixed unique identification ID. The RFID tag 252b may be a built-in tag or a stand-alone tag. The device 254 uses the RFID reader 1b to write information into the RFID tag 252a. The device 256 uses the RFID reader 2 to write information into the RFID tag 252b.

The RFID reader 2 or the device 256 may use information read from the RFID tag 252a for a time dependent application or a control decision. The RFID reader 1b or the device 254 may use information read from the RFID tag 252b for a time dependent application or a control decision. The device 254 may provide to the RFID tag 252a information associated with configuration of the RFID reader 2, the device 256 or a combination thereof. The device 256 may provide to the RFID tag 252b information associated with configuration of the RFID reader 1b, the device 254 or a combination thereof.

Figure 7:
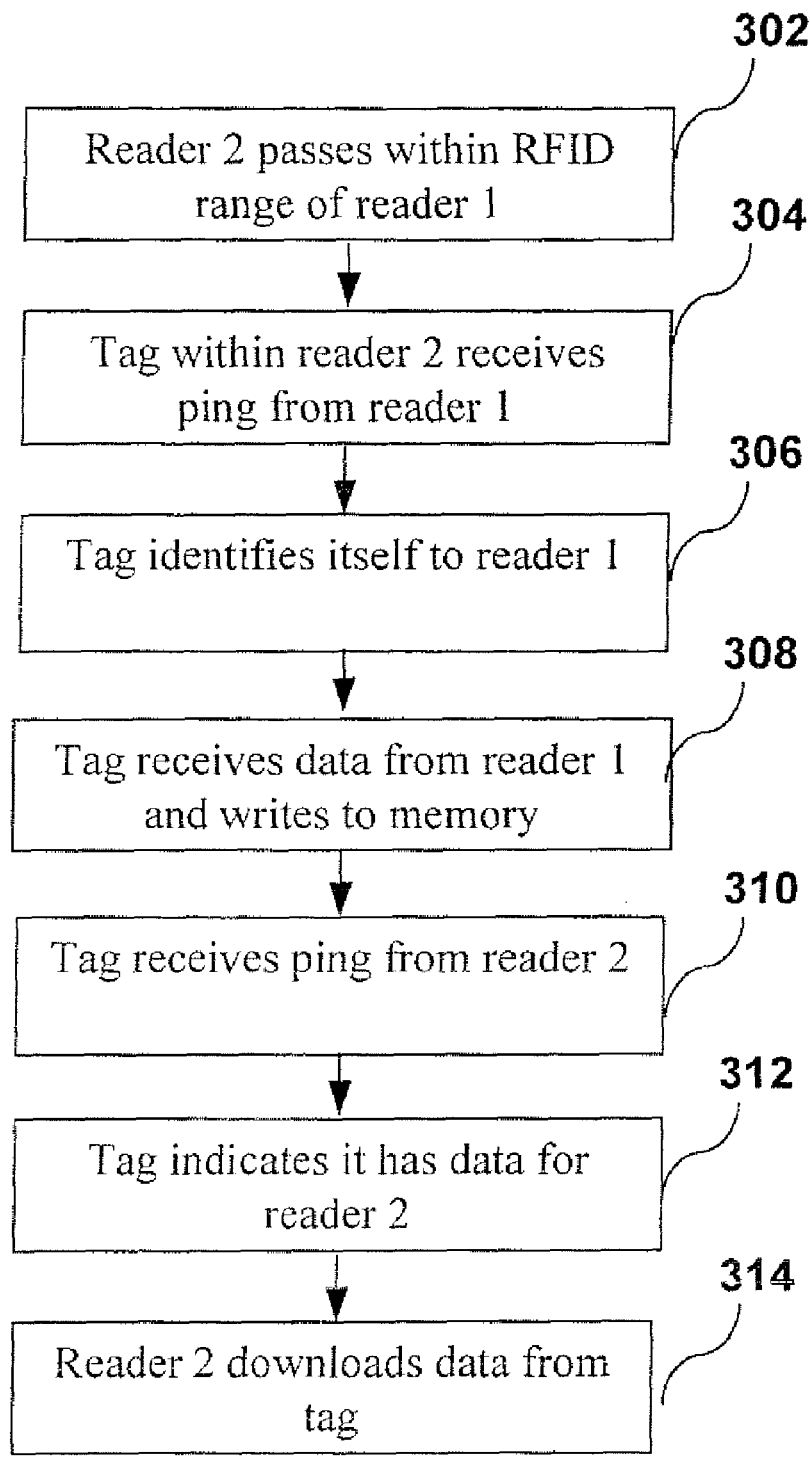
FIG. 7 is a flowchart illustrating an example of a method for RFID based communication in accordance with an embodiment of the present invention.

FIG. 7 illustrates an example of a method for RFID based communication in accordance with an embodiment of the present invention. For the purposes of the method presented in FIG. 7, an RFID reader 1 may or may not have a tag. The RFID reader 1 may be the RFID reader 1a of FIGS. 4-5 or the RFID reader 1b of FIG. 6.

Referring to FIGS. 4-7, at step 302 the RFID reader 2 passes within RFID range of the RFID reader 1. The tag uniquely assigned to the RFID reader 2 receives a ping from the RFID reader 1 at step 304 and then identifies itself to the RFID reader 1 at step 306. At step 308 the tag assigned to the RFID reader 2 receives data from the RFID reader 1 and writes it to internal memory (e.g., 206 of FIG. 2, 246 of FIG. 3). At step 310 the tag receives a ping from the RFID reader 2 and indicates it has data for the RFID reader 2 at step 312. At step 314 the RFID reader 2 downloads the data from the tag.

The steps of FIG. 7 are applicable to the built-in tag of FIG. 1 and the stand-alone tag of FIG. 3.

The method of FIG. 7 can be used within the following two example situations. In the first situation a distribution warehouse has a portal RFID reader (RFID reader 1), and one or more forklifts with an RFID reader (RFID reader 2) located thereon. When the forklift passes through the portal information is transmitted to the RFID reader 2 located on the forklift via its tag. This information can then be displayed on a monitor attached to and operating in conjunction with the RFID reader 2. In one scenario this information indicates where items being transported by the forklift should be delivered. From the perspective of the reader 1, when a forklift passes within its RFID range, software controlling the RFID reader 1 writes data to the tag of the RFID reader 2. Software controlling the RFID reader 2 then polls for any updated information on its tag to determine what information to print onto the screen associated therewith. In this example the RFID reader 2 obtains information without using its communications radio (e.g., 222 of FIG. 2) for these software updates. Rather having RFID reader 1 wired to and in communications with an additional network, the updates are provided from the network to the RFID reader with the RFID communications network.

In a second example, the RFID reader 2 is a portal RFID reader, and an RFID tag uniquely assigned to the RFID reader 2 is used to configure the portal. For example, configurational or update information is written to the RFID tag of the RFID reader 2 when a second RFID reader passes therethrough. The RFID reader 2 then reads the configuration information from its own RFID tag.

The present invention has been described with regard to one or more embodiments. However, it will be apparent to persons skilled in the art that a number of variations and modifications can be made without departing from the scope of the invention as defined in the claims.

What is claimed is:

1. A Radio Frequency Identification (RFID) reader including a printed circuit board (PCB), the PCB comprising:
   a built-in RFID read-write tag uniquely assigned to the RFID reader and integrated into the RFID reader, the built-in RFID read-write tag including RFID tag circuitry having a memory and first RF communication circuitry for communicating with an external RFID reader;
   a reader circuitry for reading from or writing information on RFID tags including the built-in RFID read-write tag and an external tag;
   a second RF communication circuitry coupled to the reader circuitry for communicating with the external RFID tag; and
   a circuit link for coupling the RFID tag circuitry to the reader circuitry, the built-in RFID read-write tag communicating with the reader circuitry via the circuit link and communicating with the external RFID reader via the first RF communication circuitry.

2. A RFID reader as claimed in claim 1, wherein the reader circuitry cooperates with the built-in RFID read-write tag to read the information from the memory.

3. A RFID reader as claimed in claim 1, wherein the RFID reader and the external RFID reader communicate with the built-in RFID read-write tag in dependence upon an identification uniquely assigned to the built-in RFID read-write tag.

4. A RFID reader as claimed in claim 1, wherein the built-in RFID read-write tag is configured to receive from the external RFID reader the information for a time dependent application or a control decision.

5. A RFID reader as claimed in claim 1, wherein the built-in RFID read-write tag is configured to receive from the external RFID reader the information on configuration of an external device, and wherein the RFID reader comprises an interface for communication with the external device such that the information on configuration of the external device is provided from the RFID reader to the external device via the interface.

6. A RFID reader as claimed in claim 1, wherein the RFID reader includes a power supply for providing power to the reader circuitry and the built-in RFID read-write tag.

7. A method for RFID communication with a Radio Frequency Identification (RFID) reader including a printed circuit board (PCB), the PCB comprising a built-in RFID read-write tag uniquely assigned to the RFID reader and integrated into the RFID reader, the built-in RFID read-write tag including RFID tag circuitry having a memory and first RF communication circuitry for communicating with an external RFID reader, the RFID reader further comprising a reader circuitry for reading from or writing tag information on RFID tags including the built-in RFID read-write tag and an external tag, a second RF communication circuitry coupled to the reader circuitry for communicating with the external RFID tag, a circuit link for coupling the RFID tag circuitry to the reader circuitry, and an interface for communication with an external device, the method comprising:
   transferring an identification of the built-in RFID read-write tag to the external RFID reader via the first RF communication circuitry of the built-in RFID read-write tag;
   receiving, in the first RF communication circuitry of the built-in RFID read-write tag, information from the external RFID reader;
   indicating to the RFID reader via the circuit link that the built-in RFID read-write tag has received the information; and
   providing the information received from the external RFID reader to the RFID reader via the circuit link, the information provided from the external RFID reader including information on configuration of the external device;
   transferring to the external device the information on configuration of the external device, from the RFID reader via the interface;
   receiving, in the external device, the information on configuration of the external device from the RFID reader; and
   implementing, in the external device, the configuration based on the configuration information transferred from the RFID reader.

8. A method as claimed in claim 7, further comprising the step of:
   in the built-in RFID read-write tag, receiving a ping from the external RFID reader, the step of transferring an identification being executed after the ping from the external RFID reader is received.

9. A method as claimed in claim 7, further comprising the step of:
   in the built-in RFID read-write tag, receiving a ping from the RFID reader via the circuit link, the step of indicating being executed after the ping from the RFID reader is received.

10. A method as claimed in claim 7, further comprising the step of:
    in the device, processing the information read from the built-in RFID read-write tag for a time dependent application or a control decision.

11. A method as claimed in claim 7, wherein the information transferred from the external RFID reader through the built-in RFID read-write tag includes information on configuration of the RFID reader.

* * * * *